(12) United States Patent
Clarke et al.

(10) Patent No.: US 8,527,385 B2
(45) Date of Patent: Sep. 3, 2013

(54) STAKEHOLDER COLLABORATION

(75) Inventors: Trevor Fred Roy Clarke, Maple (CA); Warren De Villiers, London (GB); Andre Ryan Edelbrock, Toronto (CA); Steve Frook, Toronto (CA); Darryl Green, Toronto (CA); Keegan Johnson, Toronto (CA)

(73) Assignee: Ethoca Technologies, Inc., Toronto, Ontario (CA)

( * ) Notice: Subject to any disclaimer, the term of this patent is extended or adjusted under 35 U.S.C. 154(b) by 11 days.

(21) Appl. No.: 13/241,116

(22) Filed: Sep. 22, 2011

(65) Prior Publication Data
US 2012/0078767 A1    Mar. 29, 2012

Related U.S. Application Data

(60) Provisional application No. 61/386,453, filed on Sep. 24, 2010.

(51) Int. Cl.
*G06Q 40/00*    (2012.01)

(52) U.S. Cl.
USPC ................... 705/35; 705/38; 705/39; 705/44; 705/80; 705/7; 705/500; 705/37; 705/36 R; 235/380

(58) Field of Classification Search
USPC .............. 705/44, 80, 7, 500, 35–39; 235/380
See application file for complete search history.

(56) References Cited

U.S. PATENT DOCUMENTS

| | | | |
|---|---|---|---|
| 7,761,380 B2 | 7/2010 | Katz | |
| 7,941,352 B2 | 5/2011 | Katz et al. | |
| 8,275,705 B2 | 9/2012 | Katz et al. | |
| 2010/0287099 A1* | 11/2010 | Liu et al. | ......................... 705/44 |
| 2011/0276489 A1* | 11/2011 | Larkin | ............................ 705/44 |

\* cited by examiner

*Primary Examiner* — Harish T Dass
(74) *Attorney, Agent, or Firm* — Sheppard, Mullin, Richter & Hampton LLP

(57) ABSTRACT

A technique for improving collaboration between relevant parties in a commercial transaction involves sending a timely alert to stakeholders with regard to a presumably fraudulent transaction. A system constructed in accordance with techniques described in this paper can integrate multiple stakeholders and service providers. The system can facilitate alerting stakeholders of a presumably fraudulent transaction and/or enabling stakeholders to alert other stakeholders.

5 Claims, 14 Drawing Sheets

From: alerts@ethoca.com [mailto:alerts@ethoca.com]
Sent: Monday, August 30, 2010 1:17 PM
To: <merchant email addresses>
Subject: Ethoca Alert - Confirmed Unauthorized Card Transaction
Hi Walmart, Please click on a link below to let us know the outcome of this alert and provide additional information on the web form.

| | | |
|---|---|---|
| Stopped | 702 | This alert allowed you to stop the fraud |
| Partially Stopped | | This alert allowed you to partially stop the fraud |
| Previously Cancelled | | Previously cancelled the fraud prior to receiving this alert |
| Too Late | | Fraudster has the goods (e.g., Already delivered or picked up in store) |
| Nothing | | e.g., The order could not be found |

Ethoca would like to notify you that the following card has been compromised and is now cancelled by the Card Issuer.

| | |
|---|---|
| Merchant: | Continental |
| Card #: | 5534521234567890 (Card is no longer valid, hence can be sent via email) |
| Date/Time: | 27-Aug-2010 12:50:36 EDT |
| Amount: | 426.00 USD |
| Transaction Type: | Card manually key entered |
| Ethoca ID: | 8F2KH8EDlWRRURQM9LAR1R3B6 |

After cancelling the transaction, please also remember to issue a refund.

Kind regards,
Ethoca

From: alerts@ethoca.com [mailto:alerts@ethoca.com]
Sent: 02 September 2010 19:17
To: <merchant email addresses>
Subject: Ethoca Alert - Confirmed Unauthorized Card Transaction Hi Walmart, Ethoca would like to notify you that you have an Issuer Alert for a confirmed fraud waiting in your Alert Queue. ⟵ 1002

Please click here to view the alert. You will be required to log in to the Ethoca Portal to view the alert. If you don't have a login please reply to this email requesting a login.

After cancelling the transaction, please also remember to issue a refund.

Kind regards,
Ethoca

FIG. 10

1100 ethoca

Walmart

» LOGOUT

Ethoca360 Portal  Welcome, WarenOne *Walmart*

Issuer Alert  IVS  My Settings  Contact Us

Alert Queue

Merchant Alert Queue

Alert Timeframe: [All Time ▼]  Transaction Type: [All ▼]  Outcome: [Not Provided ▼]  [Refresh]

Alert Queue

| Alert Date/Time (AFT) | Issuer | Fraud Type | Merchant | Card Number | Trans. Date/Time (AFT) | Amount | Transaction Type | Outcome |
|---|---|---|---|---|---|---|---|---|
| 2010-08-25 21:08:32 | Signals 1 | Confirmed | Walmart | 8002100901163800 | 2010-08-17 09:00:00 | 99.76 USD | Card Swiped | Not provided |
| 2010-08-25 21:08:32 | Signals 1 | Confirmed | Walmart | 8002100901163800 | 2010-08-17 09:00:00 | 99.76 USD | Card Swiped | Not provided |
| 2010-08-25 21:08:32 | Signals 1 | Confirmed | Walmart | 8002100901163800 | 2010-08-17 09:00:00 | 99.76 USD | Card Swiped | Not provided |
| 2010-08-25 21:08:32 | Signals 1 | Confirmed | Walmart | 8002100901163800 | 2010-08-17 09:00:00 | 99.76 USD | E-commerce | Not provided |
| 2010-08-25 21:08:32 | Signals 1 | Confirmed | Walmart | 8002100901163800 | 2010-08-17 09:00:00 | 99.76 USD | Manual Entry | Not provided |
| 2010-08-25 21:08:32 | Signals 1 | Confirmed | Walmart | 8002100901163800 | 2010-08-17 09:00:00 | 99.76 USD | Manual Entry | Not provided |
| 2010-08-25 21:08:32 | Signals 1 | Confirmed | Walmart | 8002100901163800 | 2010-08-17 09:00:00 | 99.76 USD | Manual Entry | Not provided |
| 2010-08-25 21:08:32 | Signals 1 | Confirmed | Walmart | 8002100901163800 | 2010-08-17 09:00:00 | 99.76 USD | Manual Entry | Not provided |
| 2010-09-03 14:33:57 | Signals 1 | Confirmed | Walmart | 919981818424450911 | 2010-03-26 05:27:11 | 3,145.63 USD | E-commerce | Not provided |

From: alerts@ethoca.com [mailto:alerts@ethoca.com]
Sent: 31 August 2010 16:23
To: alerts;
Subject: Confirmed Unauthorized Transaction Alert - Outcome received from WALMART

| | |
|---|---|
| Merchant: | WALMART |
| Card #: | 4147091234567890 |
| Date/Time: | 28-Aug-2010 15:18:35 EDT |
| Amount: | 2066.20 USD |
| Ethoca ID: | BOVB1MXMBAYIBFT8KPF1N3R3K |
| Outcome: | Stopped |

FIG. 13

STAKEHOLDER COLLABORATION

CROSS-REFERENCE TO RELATED APPLICATIONS

The present application claims priority to U.S. Provisional Patent Application No. 61/386,453, filed on Sep. 24, 2010, entitled STAKEHOLDER COLLABORATION, and which is incorporated herein by reference.

BACKGROUND

Various payment methods can be used when purchasing goods and services. However, it is possible for a criminal to fraudulently use a payment method, and particularly a credit card that belongs to some other person. There have been efforts to ameliorate harm from fraud.

For example, a credit card issuer could call a cardholder after a credit card transaction is made in order to confirm that the cardholder was the one who was responsible for the transaction. If the cardholder denies making the credit card transaction, it may be the case that the transaction was fraudulent. After receipt of cardholder-confirmed fraudulent activity, the issuer can cancel the card, issue a new card, send the relevant information to a recovery department, etc. The issuer may or may not also process an affidavit and check for a refund. Finally, the issuer may or may not process a chargeback. The entire process can take weeks. Frequently, a merchant is contacted too late to do anything about the fraudulent transaction.

Problems with this approach include the timeframe, the lack of collaboration with merchants, and the lack of collaboration with other stakeholders in the transaction. A system that increases fraud detection and communication speed and/or improves collaboration between relevant parties would be desirable.

SUMMARY

A technique for improving collaboration between relevant parties in a commercial transaction involves sending a timely alert to stakeholders with regard to a presumably fraudulent transaction. Stakeholders can include merchants, who are likely to want to stop a transaction upon receipt of the alert, issuers, who are likely to want to cancel the payment device involved in the fraudulent transaction, carriers, who are likely to want to cancel shipment of the fraudulent order, payments entities, who are likely to want to forward the alert to relevant parties, banks, suppliers, and other entities with a stake in, or who can provide services in association with, the transaction or fallout from fraudulent activity. For the alert and/other services, one or more of the stakeholders can be charged a fee.

A system constructed in accordance with techniques described in this paper can integrate multiple stakeholders and service providers. The system can facilitate alerting stakeholders of a presumably fraudulent transaction and/or enabling stakeholders to alert other stakeholders. For example, each stakeholder could be given the ability to generate an alert, receive an alert, and forward the alert to another stakeholder.

BRIEF DESCRIPTION OF THE DRAWINGS

FIG. 4 depicts a screenshot of a single transaction submission form associated with a specific implementation of a transaction management system.

FIG. 5 depicts a screenshot of a batch transaction submission form associated with a specific implementation of a transaction management system.

FIG. 7 depicts an example of an email alert that could be sent in an implementation of an alert management system.

FIG. 8 depicts a screenshot of a feedback form associated with a specific implementation of a feedback management system.

FIG. 10 depicts an example of an email alert that could be sent in an implementation of an alert management system, but that does not include all relevant information for a stakeholder to identify (in the text of the alert message) a transaction.

FIG. 11 depicts a screenshot of an alert queue associated with a specific implementation of an alert management system.

FIG. 12 depicts a screenshot of a feedback form associated with a specific implementation of a feedback management system.

FIG. 13 depicts an example of an email alert updating message that could be sent in an implementation of an alert management system.

DETAILED DESCRIPTION

Figure 1:
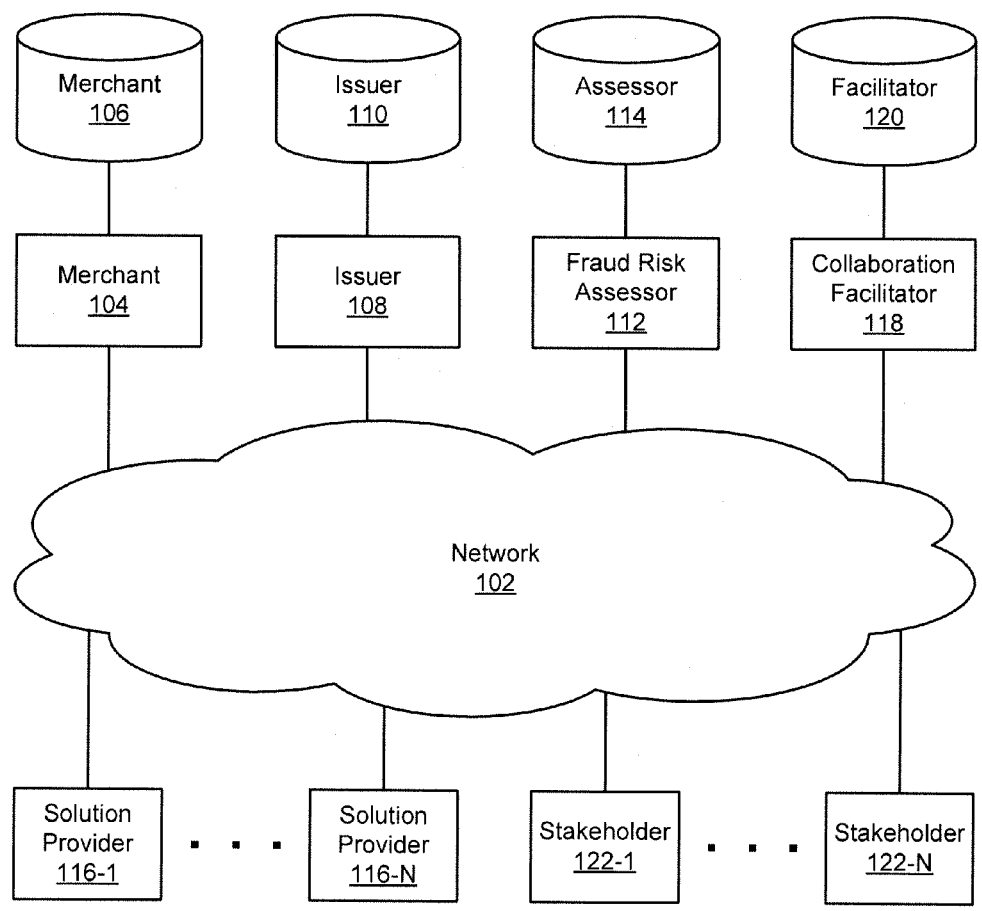
FIG. 1 depicts an example of a stakeholder collaboration network.

FIG. 1 depicts an example of a stakeholder collaboration network 100. In the example of FIG. 1, the collaboration network 100 includes a network 102, a merchant device 104, a merchant datastore 106, an issuer device 108, an issuer datastore 110, a fraud risk assessor device 112, an assessor datastore 114, solution provider device devices 116-1 to 116-N (collectively, other solution provider devices 116), a collaboration facilitator device 118, a facilitator datastore 120, stakeholder devices 122-1 to 122-N (collectively, other stakeholder devices 122). The other solution provider devices 116 and other stakeholder devices 122 can be considered optional, though the inclusion of the other solution provider devices 116 and the other stakeholder devices 122 increases the power of the collaboration network 100 as should be apparent from the following discussion.

In the example of FIG. 1, the network 102 can include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the network 102 broadly includes, as understood from relevant context, anything from a minimalist coupling of the components illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. File management systems are typically stored in non-volatile storage and cause the processor to execute the various acts required by the operating system to input and output data and to store data in the memory, including storing files on the non-volatile storage. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. Another example of operating system software with associated file management system software is VM (or VM/CMS), which refers to a family of IBM virtual machine operating systems used on IBM mainframes System/370, System/390, zSeries, System z, and compatible systems, including the Hercules emulator for personal computers.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to FIG. 1, in the example of FIG. 1, the merchant device 104 is coupled to the network 102. The merchant device 104 can be implemented on a known or convenient computer system. Only one merchant device 104 is illustrated in FIG. 1, but it should be understood that a single merchant could have multiple distinct devices and multiple merchants could be coupled to the network 102 and part of the collaboration network 100. Moreover, partial functionality might be provided by a first device and partial functionality might be provided by a second device, where together the first and second devices provide the full functionality attributed to the merchant device 104.

The exact configuration of the merchant device 104 can vary depending upon the merchant and/or type of sale. Businesses are sometimes categorized into three groups, brick-and-mortar, virtual, and click-and-mortar. Brick-and-mortar businesses operate in a physical store without an Internet presence. Virtual businesses operate on the Internet only without a physical store (e.g., amazon.com and expedia.com). Click-and-mortar businesses operate in a physical store and on the Internet (e.g., REI and Barnes & Noble). Depending upon implementation, the merchant associated with the merchant device 104 can include any of these business types.

As used in this paper, payment can be in an applicable known or convenient form, including cash, check, debit, credit, or some other form of payment. Cash is generally not going to trigger fraud alerts, though it is conceivable that counterfeit cash could trigger countermeasures as described in this paper. Payments can be facilitated over a network by a financial cybermediary (e.g., PayPal), an electronic check (e.g., online banking), electronic bill presentment and payment (EBPP) (e.g., via Checkfree or Quicken), a digital wallet, or some other applicable known or convenient technique. Sales can be conducted as auctions (including e-auctions, forward auctions, reverse auctions, etc.), as well.

Point of sale (POS) is the location where a transaction occurs. Shops can be organized into malls (including e-malls) and the mall operator may or may not be a stakeholder in transactions, depending upon the arrangement. A "checkout" refers to a POS terminal or more generally to the hardware and software used for checkouts, the equivalent of an electronic cash register. As used in this paper, POS can refer to the location of an exchange of goods or services for payment, such as at a brick-and-mortar store, across a network at a server, such as at a virtual store, or in some other applicable known or convenient manner. A POS terminal manages the selling process by a salesperson-accessible interface, which typically includes a receipt generation device. Many POS system are accessible remotely by authorized personnel or remote servers.

Retail POS systems typically include a computer, monitor, cash drawer, receipt printer, customer display, and a barcode scanner, and can further include a weight scale, integrated credit card processing system, a signature capture device, and a customer pin pad device. The POS system software can typically handle many customer-based functions such as sales, returns, exchanges, layaways, gift cards, gift registries, customer loyalty programs, BOGO (buy one get one), quantity discounts, etc. POS software can also allow for functions such as pre-planned promotional sales, manufacturer coupon validation, foreign currency handling, and multiple payment types.

The POS unit handles the sales to the consumer but it is only one part of the entire POS system used in a retail business. "Back-office" computers typically handle other functions of the POS system such as inventory control, purchasing, receiving and transferring of products to and from other locations. Other typical functions of a POS system are to store sales information for reporting purposes, sales trends, cost/price/profit analysis, etc. Customer information may be stored for receivables management, marketing purposes, specific buying analysis, etc. Many retail POS systems include an accounting interface that "feeds" sales and cost of goods information to independent accounting applications.

Hospitality POS systems are computerized systems incorporating registers, computers, and peripheral equipment, usually on a computer network. Like other POS systems, these systems often keep track of sales, labor, and payroll, and can generate records used in accounting and book keeping. Hotel POS software allows for transfer of meal charges from dining room to guest room with a button or two. It may also need to be integrated with property management software.

In the most recent restaurant technologies, registers are computers, sometimes with touch screens. The registers connect to a server, often referred to as a "store controller" or a "central control unit." Restaurant POS systems often assist businesses to track transactions in real time. Typical restaurant POS systems are able to print guest checks, print orders to kitchens and bars for preparation, process credit cards and other payment cards, and run reports. In addition to registers, drive through and kitchen monitors may be used by store personnel to view orders. Once orders appear they may be deleted or recalled by "bump bars," which are small boxes with different buttons for different uses.

The data maintained by a merchant can be stored in the merchant datastore 106, which is coupled to the merchant device 104. The merchant datastore 106 will typically include at least a transaction record, which will typically include an identifier of the goods or services purchased, the transaction amount, and the date. The merchant device 104 will often share at least a portion of a particular transaction record with other stakeholders in the transaction. For example, the merchant may obtain a credit card number and expiration date for a card holder and share the information, along with the transaction amount and perhaps other information, with a credit card issuer. As another example, the merchant may obtain a shipping address, which the merchant can share, along with perhaps other information, with a carrier tasked with shipping the goods to the purchaser. A payment service provider (PSP) may also be involved in the transaction and receive and/or share relevant data with relevant stakeholders. The government can also be considered a stakeholder with which information must be shared for tax and perhaps regulatory purposes.

The merchant datastore 106, and other datastores described in this paper, can be implemented, for example, as software embodied in a physical computer-readable medium on a general- or specific-purpose machine, in firmware, in hardware, in a combination thereof, or in an applicable known or convenient device or system. This and other datastores described in this paper are intended, if applicable, to include any organization of data, including tables, comma-separated values (CSV) files, traditional databases (e.g., SQL), or other known or convenient organizational formats.

In an example of a system where the merchant datastore 106 is implemented as a database, a database management system (DBMS) can be used to manage the merchant datastore 106. In such a case, the DBMS may be thought of as part of the merchant datastore 106 or as part of the merchant device 104, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In the example of FIG. 1, the issuer device 108 is coupled to the network 102. In an embodiment, the issuer device 108 is associated with an issuer of a credit or debit card. However, certain of the techniques described in this paper could be applicable to bank check issuers, travelers' check issuers, or even cash issuers (e.g., the government). The issuer device 108 can be implemented on a specifically configured known or convenient computer system. Only one issuer device 108 is illustrated in FIG. 1, but it should be understood that a single issuer could have multiple distinct devices and multiple issuers could be coupled to the network 102 and part of the collaboration network 100. Moreover, partial functionality might be provided by a first device and partial functionality might be provided by a second device, where together the first and second devices provide the full functionality attributed to the issuer device 108.

In the example of FIG. 1, the issuer datastore 110 is coupled to the issuer device 108. The issuer datastore 110 can, for example, include data associated with card holders. When data, such as transaction data, is received from merchants or other stakeholders, such as PSPs, the data can be stored in the issuer datastore 110, which can yield relatively rich information about a cardholder and associated transactions.

In the example of FIG. 1, the fraud risk assessor device 112 is coupled to the network 102. The fraud risk assessor device 112 can be implemented on a known or convenient computer system. Only one fraud risk assessor device 112 is illustrated in FIG. 1, but it should be understood that a single assessor could have multiple distinct devices and multiple assessors could be coupled to the network 102 and part of the collaboration network 100. Moreover, partial functionality might be provided by a first device and partial functionality might be provided by a second device, where together the first and second devices provide the full functionality attributed to the fraud risk assessor device 112. Due to the timeliness requirements that are described in more detail later in this paper, it would be desirable for the fraud risk assessor device 112 to either run in real time or at least quickly relative to the variables of a given transaction. Real-time functionality can include short-term buffering of items for processing by a human are artificial operator. Timeliness is defined by whether a process can be performed prior to total loss from a fraudulent transaction. For example, processing speed must be high if a goal of a specific implementation is to stop a fraudster at or just outside of a brick-and-mortar store. Processing speed can be somewhat slower, and still be timely, if a goal of a specific implementation is to stop a purchased item from being shipped to a fraudster.

In the example of FIG. 1, the assessor datastore 114 is coupled to the fraud risk assessor device 112. Where the assessor datastore 114 is managed by an issuer, the assessor datastore 114 can be considered to include all of the information in the issuer datastore 110. Where the assessor datastore 114 is independent of an issuer, the assessor datastore 114 can be expected to include a subset of such data, plus perhaps other data that the assessor collects to better perform the function of assessing fraud risk in association with transactions.

In the example of FIG. 1, the other solution provider devices 116 are coupled to the network 102. The other solution provider devices 116 can be implemented on known or convenient computer systems. It should be understood that a single solution provider could have multiple distinct devices. Moreover, partial functionality might be provided by a first device and partial functionality might be provided by a second device, where together the first and second devices provide the full functionality attributed to one of the other solution provider devices 116.

The other solution provider devices 116 can provide services to the fraud risk assessor device 112, such as by providing information about the identity of persons (identity solution providers), or data that helps identify fraudulent activity (fraud solution providers). Data that helps identify fraudulent activity can include information about an IP address (e.g., whether it is a "good" address), information about the type of goods (e.g., whether the goods are of a type that are easy to fence), or other applicable convenient data. Stakeholders may or may not have internal solutions that replace or duplicate the services of the other service provider devices 116. Any data provided by the other solution providers 116 can be stored in the assessor datastore 114 (or other datastores, if applicable).

In the example of FIG. 1, the collaboration facilitator device 118 is coupled to the network 102. The collaboration facilitator device 118, which is described in more detail with reference to FIG. 2, can be implemented on a known or convenient computer system. Only one collaboration facilitator device 118 is illustrated in FIG. 1, but it should be understood that a single collaboration facilitator could have multiple distinct devices and multiple collaboration facilitators could be coupled to the network 102 and part of the collaboration network 100. Moreover, partial functionality might be provided by a first device and partial functionality might be provided by a second device, where together the first and second devices provide the full functionality attributed to the collaboration facilitator device 118.

In the example of FIG. 1, the collaboration facilitator device 118 is coupled to the facilitator datastore 120. Where the collaboration facilitator device 118, or a portion thereof, is managed by a stakeholder, such as the merchant or an issuer, the facilitator datastore 120 can be considered to include all of the information in the relevant datastore. Where the facilitator datastore 120 is independent of a stakeholder, the facilitator datastore 120 can be expected to include a subset of stakeholder data, plus perhaps other data collected to better perform the function of collaborating to provide timely fraud risk alerts in association with transactions.

In the example of FIG. 1, the other stakeholder devices 122 are coupled to the network 102. The other stakeholder devices 122 can be implemented on known or convenient computer systems. It should be understood that a single stakeholder could have multiple distinct devices. Moreover, partial functionality might be provided by a first device and partial functionality might be provided by a second device, where together the first and second devices provide the full functionality attributed to one of the other stakeholder devices 122.

Transactions are likely to have at least a merchant stakeholder and an issuer stakeholder. Other stakeholders can include cardholders, online brokers, banks, suppliers, PSPs, carriers, the government, and trading partners, but generally include any entity that has a stake in a particular transaction. A stake can include a pecuniary interest, an interest in not wasting time or other resources caused by fraud, an interest in preventing fraud, an interest in not providing, receiving, or transporting fraudulently-obtained goods, or the like.

In the example of FIG. 1, in operation, a transaction is performed in association with the merchant device 104. The transaction can include purchases made electronically, such as at an e-merchant website. Some examples of e-merchants include Amazon, eBay, Expedia, and Travelocity, to name several. Techniques are also applicable to mobile commerce (m-commerce) so the transaction can include purchases made with a mobile device. The transaction can include purchases made at a brick-and-mortar store, as well, typically through the use of a POS system. The data associated with a transaction (the transaction data) is stored in the merchant datastore 106, and can be used to comply with tax laws, manage inventory, or assist in the performance of other tasks.

The merchant can give other stakeholders some or all of the transaction data. For example, if a credit card is used, the merchant can provide the credit card number, expiration date, transaction amount, and perhaps a security code associated with the transaction to the issuer device 108. The transaction data is stored in association with the relevant cardholder in the issuer datastore 110. This enables the issuer to keep track of consumer transactions at merchants by cardholders.

The merchant can give other solution providers some or all of the transaction data. For example, if a credit card is used, the merchant can provide transaction data to the fraud risk assessor device 112. The risk assessor can use data in the assessor datastore 114 and the transaction data to determine a risk of fraud associated with the transaction. Different levels of risk can provoke different responses. For example, if the risk assessor determines that the risk of fraud reaches a call-check threshold, a human or artificial operator could be prompted to call the relevant cardholder to ask whether a transaction for which data was just received was actually performed by the cardholder. At some point, for example after confirmation that the cardholder did not perform the transaction, the risk assessor can generate a confirmed fraud alert.

Some card issuers have in-house fraud risk assessor functionality. Where a distinction is intended to be drawn between an issuer that can confirm fraud and a third party service provider that can confirm fraud, the former can be referred to as generating an issuer-confirmed alert and the latter can be referred to as generating an assessor-confirmed alert. Note that issuer-confirmed is a more specific subset of assessor-confirmed where the issuer is also the assessor (though additional solution providers could still be used to improve the assessor's capabilities).

Although analytics are not usually definitive it may be possible, depending upon the implementation of the collaboration network 100, to generate an alert without getting cardholder confirmation. If cardholder confirmation is obtained, the alert can be referred to as a cardholder-confirmed alert. It may be noted that even cardholder confirmation is not definitive (e.g., a cardholder's spouse may have performed a credit card transaction that the cardholder does not know about, making cardholder confirmation potentially erroneous), and it can be valuable to supplement cardholder confirmation with analytics (e.g., an identity solution provider could identify the cardholder's spouse as a potential source of the transaction).

The collaboration facilitator device 118 receives the confirmed alert and distributes the confirmed alert to the merchant, issuer, and/or other stakeholders. The collaboration facilitator device 118 can also save data in the facilitator datastore 120. It is typically the case that stakeholders are more willing to provide relevant data in the case of suspected fraud, particularly if the suspected fraud is confirmed by a trustworthy party.

The various devices described in the example of FIG. 1 can be implemented with engines that carry out various processes. Engines, as described below and in this paper generally, refer to computer-readable media coupled to a processor. The computer-readable media have data, including executable files, that the processor can use to transform the data and create new data. An engine can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Figure 2:
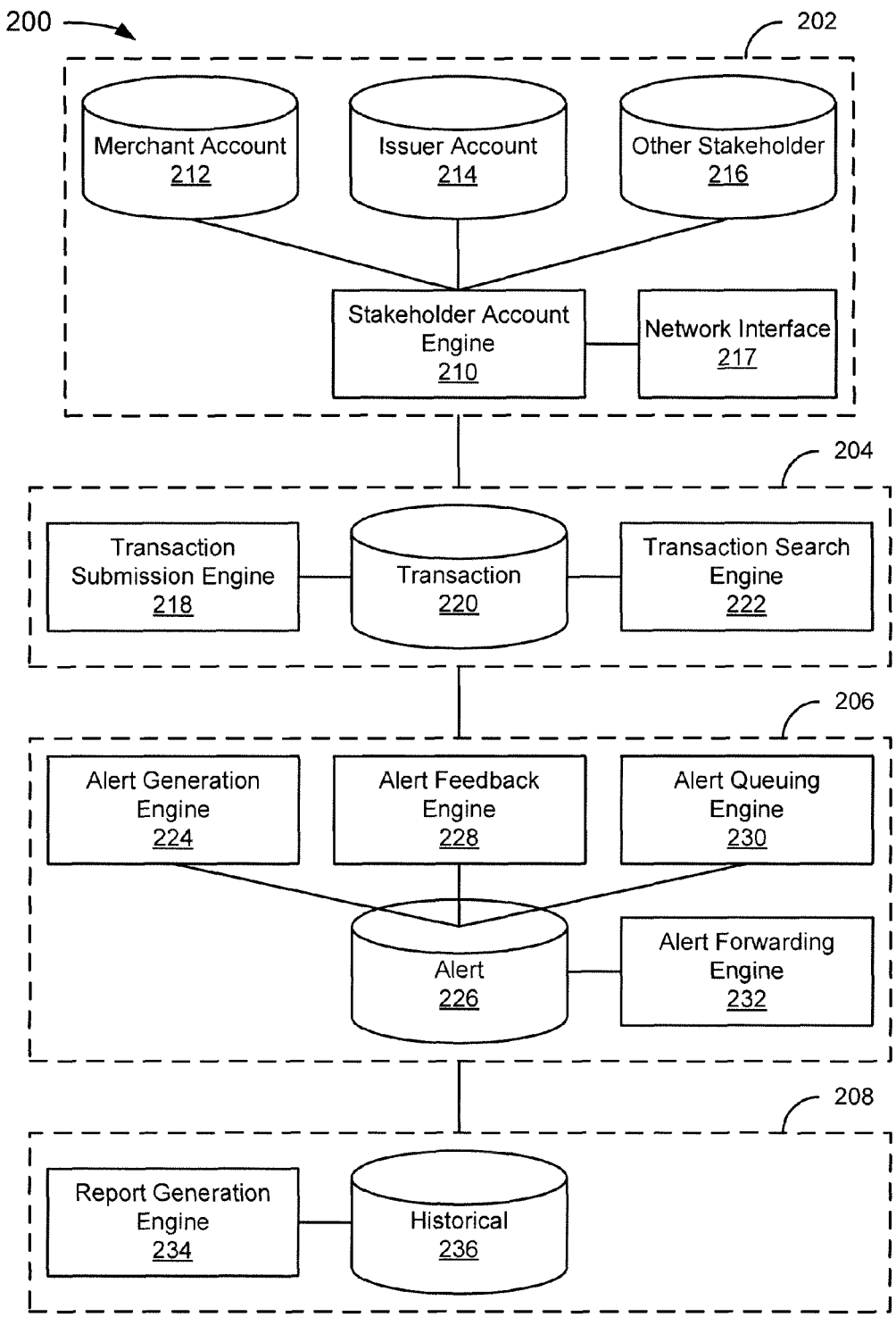
FIG. 2 depicts an example of a stakeholder collaboration network system.

FIG. 2 depicts an example of a stakeholder collaboration network system 200. The system 200 can be conceptually divided into multiple subsystems. In the example of FIG. 2, the system 200 is conceptually divided into a stakeholder management subsystem 202, a transaction management subsystem 204, an alert management subsystem 206, and a historical data management subsystem 208.

In the example of FIG. 2, the stakeholder management subsystem 202 includes a stakeholder account engine 210, a merchant account datastore 212, an issuer account datastore 214, an other stakeholder account datastore 216, and a network interface 217. Strictly speaking, any combination of stakeholders could be managed by the system 200, but it is likely that at least a merchant (or the equivalent) and an issuer (or the equivalent) will receive the most value in at least some collaborative networks. Other stakeholders are optional, but there are advantages to including other stakeholders, such as carriers, payment service providers, affiliates, agents, the government, etc., when relevant in a given context.

Figure 3:
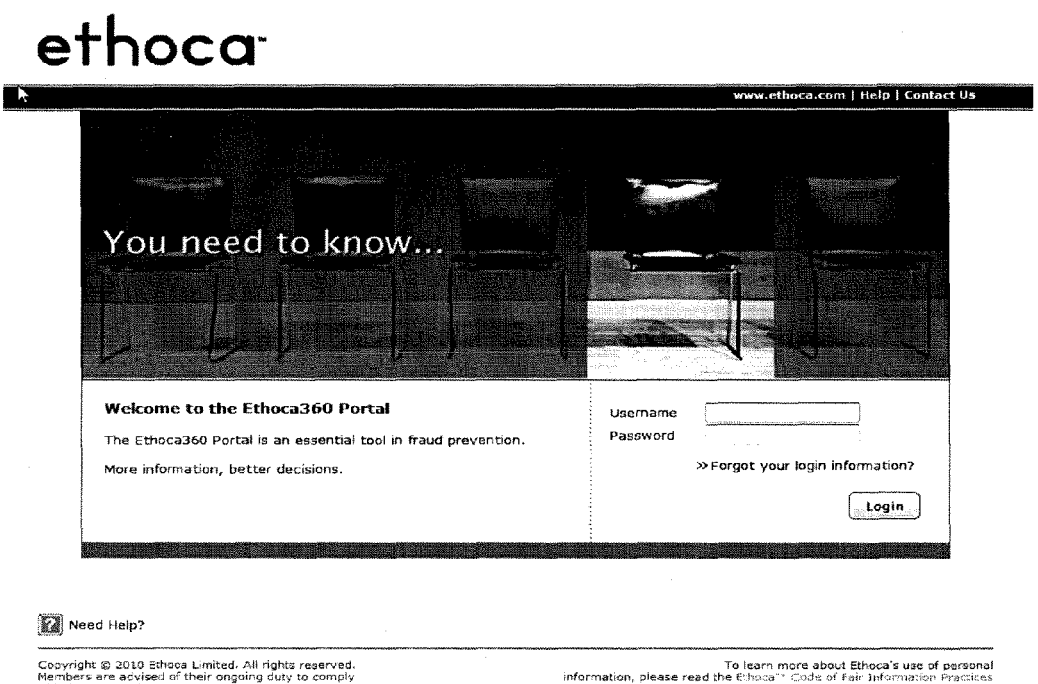
FIG. 3 depicts a screenshot of a login page associated with a specific implementation of a stakeholder account management system.

The stakeholder account engine 210 can include a server that provides a portal login for stakeholders via the network interface 217. The portal can include fields that are typical for a password-protected site, such as username and password. In a typical implementation, when a stakeholder user logs into the site, the stakeholder user must enter a valid username and password. The site can include applicable convenient fields, links, and content, such as a "help" hyperlink, a "contact us" hyperlink, and one or more links to other sites. FIG. 3 depicts a screenshot 300 of a login page associated with a specific implementation of a stakeholder account management system.

It should be noted that although relevant stakeholders can have accounts, it is not necessarily a requirement. For example, one or more stakeholders in a particular transaction might not have accounts that enable login, but still have data records or fields associated with them. For example, a merchant may have a login account and a carrier the merchant uses may not have a login account, but the merchant can still use the system 200 to forward alerts to the carrier, and the carrier may or may not receive reports from the system 200. A subset of the functionality described with respect to stakeholders with accounts may be applicable to stakeholders without accounts. For example, a carrier without an account may or may not be prompted to provide feedback associated with an alert, such as feedback regarding whether a cancelled shipment was successfully cancelled.

The stakeholder account engine 210 can manage accounts for multiple different stakeholders. Data associated with the accounts can be stored in the datastores 212, 214, 216. The datastores 212, 214, 216 can include login information (e.g., username and password) and additional data provided by stakeholders, generated through illustrated engines in FIG. 2 or by other engines, and/or provided by solution providers (not shown) that is confidential, and not shared with other stakeholders. The stakeholder account engine 210 can provide data to a stakeholder securely outside of alerts, as described below.

For illustrative purposes, it is assumed that transaction data is managed by the transaction management subsystem 204, though that does not necessarily mean that the data is managed in a datastore that is physically (or even logically) separate from the datastores 212, 214, 216.

In the example of FIG. 2, the transaction management subsystem 204 includes a transaction submission engine 218, a transaction datastore 220, and a transaction search engine 222. The transaction submission engine 218 facilitates submission of potentially fraudulent transactions to the system 200, which are maintained in the transaction datastore 220. The likely source of a transaction submission is from an issuer because they are often the link in the stakeholder chain with data sufficient to identify potential fraud. However, depending upon the implementation, any stakeholder could submit a potentially fraudulent transaction. In an alternative, the transaction submission engine 218 could be used to submit all transactions, all transactions of a particular type, or some other subset of transactions. In such an alternative, a fraud solutions provider can be used to identify potentially fraudulent transactions among the transactions that are submitted.

Figure 4:
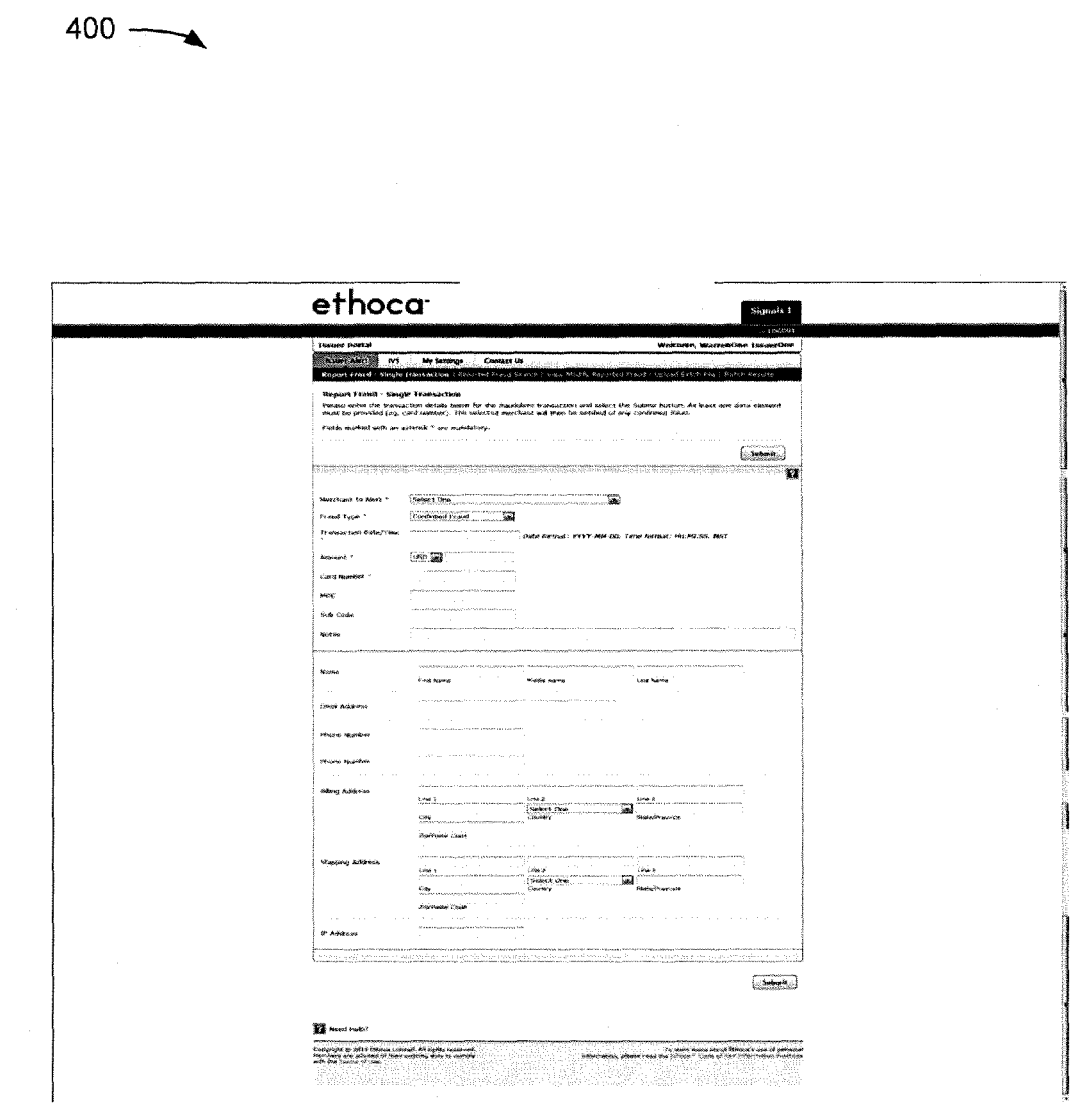

There are multiple ways to submit a transaction. Two examples are a single transaction submission and a batch transaction submission. With single transaction submissions, a stakeholder can submit transactions one at a time. For an issuer, the report can include, for example, the merchants to alert, the type of fraud (e.g., confirmed fraud), the transaction date/time, the amount, the card number, the type of card, the subcode, notes, or the like. Some of the fields may be required by the system to ensure that a useful alert can be generated (e.g., credit card number or at least a transaction ID). The submission can also enable entry of a name, email address, phone number, billing address, shipping address, IP address, or the like. Other stakeholder transaction submissions can have the same, similar, or different data requirements. FIG. 4 depicts a screenshot 400 of a single transaction submission form associated with a specific implementation of a transaction management system.

For some stakeholders, single transaction submission might be considered too much of a burden due to the number of transactions that are submitted. With batch filing, stakeholders can prepare a file of multiple transactions for upload to the system. In an actual implementation, the file types include CSV, TSC, and XLS files, but there is no particular reason why other file types could not be used by a properly configured system. The use of batch files could reduce the response time in alerting stakeholders, though not necessarily by much if the batch files are submitted relatively quickly. FIG. 5 depicts a screenshot 500 of a batch transaction submission form associated with a specific implementation of a transaction management system. It may be noted that the data provided in each transaction of a batch submission can be similar to the data provided in single transaction submissions. An implementation may include integration via Application Programming Interface (API) in which a stakeholder could integrate submission, searching, queuing, and alerting directly into their own management interfaces.

The transaction search engine 222 facilitates a search of previously reported transactions. This can be useful for stakeholders that wish to see what transactions they have submitted in the past. The search may or may not include limitations on what transactions can be found, such as by only enabling stakeholders that are associated with a particular transaction to search the particular transaction. For example, where a first merchant and a second merchant report transactions, it may or may not be desirable to enable the first merchant to search the transactions reported by the second merchant. In some cases, data could be "scrubbed" to ensure that sensitive personal information is not distributed, but still include transaction data that is useful for showing trends or risks.

Figure 6:
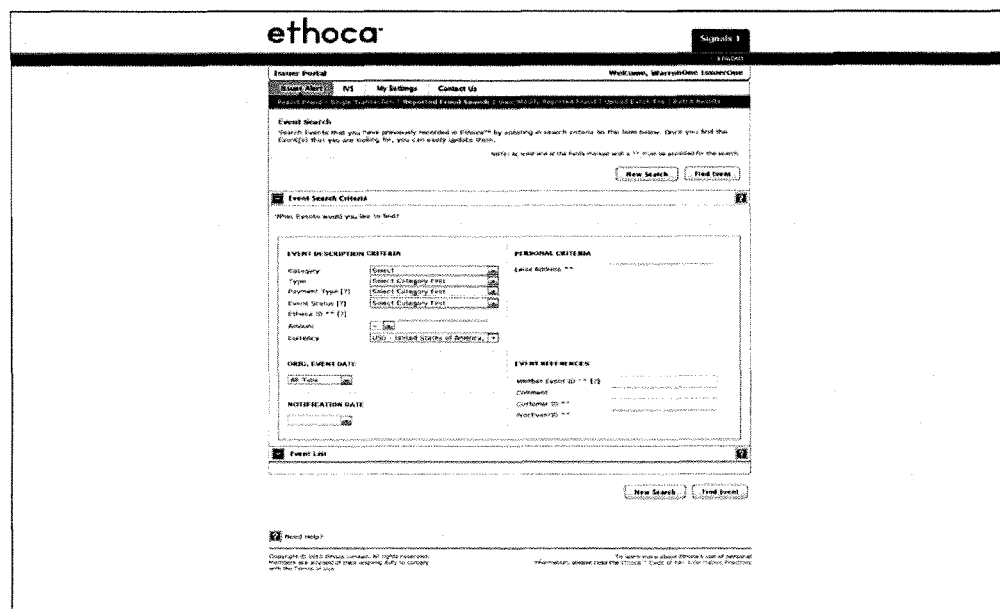
FIG. 6 depicts a screenshot of a transaction search form associated with a specific implementation of a transaction management system.

The transaction search engine 222 can provide search fields useful for narrowing a search to an appropriate subset of transactions in the transaction datastore 220. Search fields can include an event category, event type, payment type, event status, a transaction ID, amount, currency, event date, notification date, personal criteria (e.g., email address), member event ID, comment, customer ID, or the like. FIG. 6 depicts a screenshot 600 of a transaction search form associated with a specific implementation of a transaction management system.

In the example of FIG. 2, the alert management subsystem 206 includes an alert generation engine 224, an alert datastore 226, an alert feedback engine 228, an alert queuing engine 230, and an alert forwarding engine 232. The alert generation engine 224 generates an alert for a transaction in the transaction datastore 220, which is stored in the alert datastore 226 and provided to relevant stakeholders. The alert can be sent as a message (e.g., email) or a notification of the alert could be sent as a message so that a stakeholder can login to the system 200 to view the alert details.

An example of an alert for a merchant generated based on an issuer-submitted transaction can include the merchant name, a card number (and perhaps an indication that the card is no longer valid and hence can be sent by email), a date/time of the transaction, an amount, a transaction type (e.g., card manually key entered), and a transaction ID (perhaps assigned by the transaction submission engine 218). The alert might include some instructions, such as an instruction to cancel the transaction and issue a refund. FIG. 7 depicts an example of an email alert 700 that could be sent in an implementation of an alert management system. The email alert can include links 702 associated with outcomes that can be provided as feedback to a transaction management system for storage in association with the relevant transaction.

The alert feedback engine 228 receives feedback from stakeholders regarding the transaction. The feedback can be facilitated by including outcome options in an alert message (see, e.g., FIG. 7), in an alert queue, or in some other way. Some examples of outcomes include previously canceled (prior to receiving the alert), stopped order (after receiving alert), partially stopped order (after receiving alert), too late (after receiving alert), nothing (e.g., the order could not be found).

Figure 8:
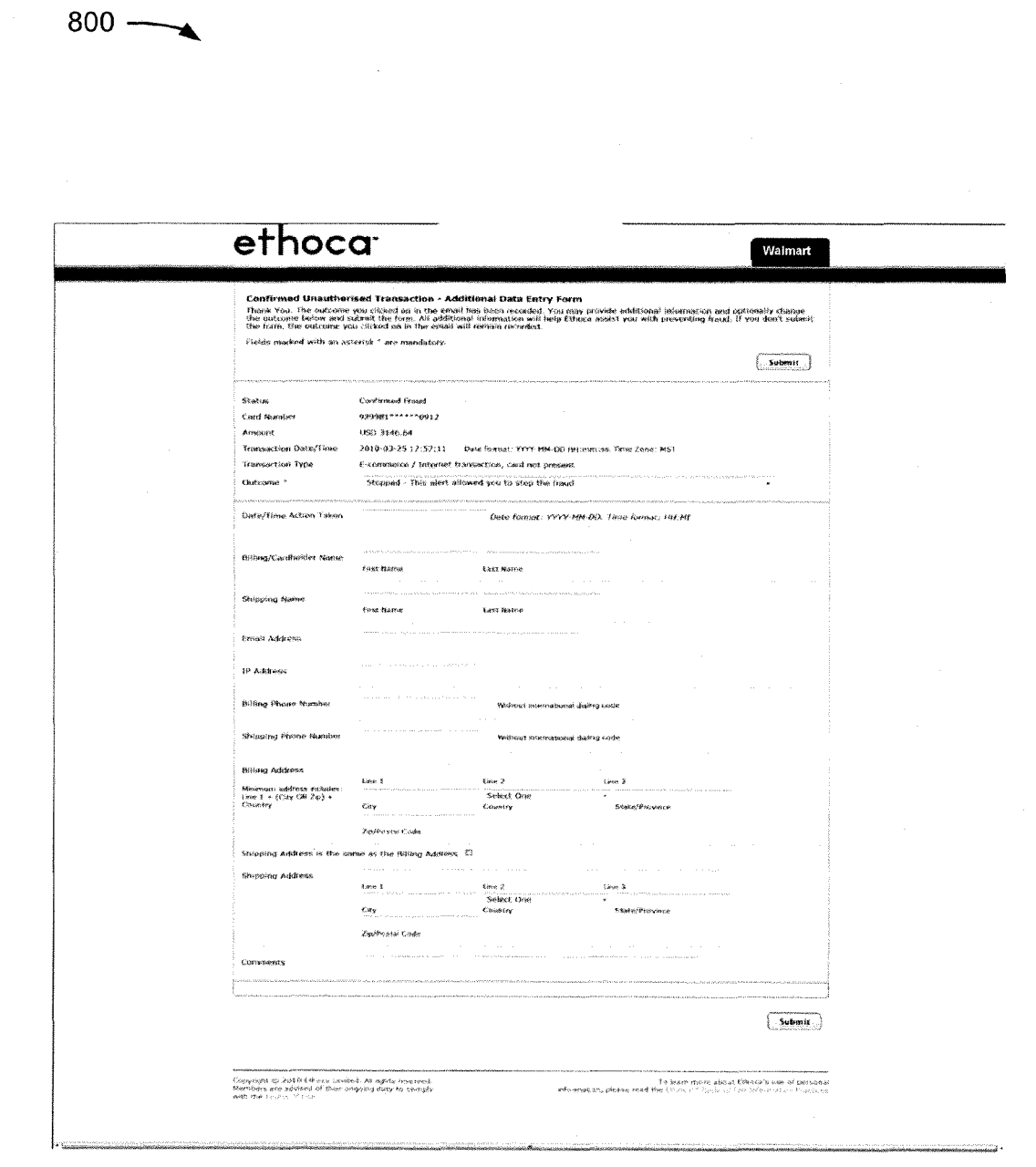

The alert feedback engine 228 could also provide a more comprehensive feedback form with relevant data fields that may or may not be editable. FIG. 8 depicts a screenshot 800 of a feedback form associated with a specific implementation of a feedback management system. Where a link from an alert message brings up the feedback form, the relevant outcome value can be preselected (e.g., in the example of FIG. 8, the Outcome field is preselected to have the value "Stopped," which may have been the link selected in the alert message body (see, e.g., FIG. 7). Other values can also be preselected, and one or more could be static based upon the transaction (e.g., the feedback provider may not be capable of changing the status, card number, amount, transaction date/time, or transaction type).

Figure 9:
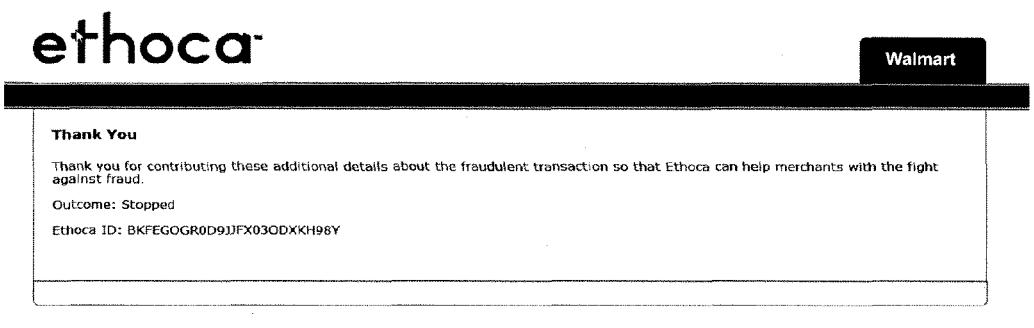
FIG. 9 depicts a screenshot of a feedback confirmation message associated with a specific implementation of a feedback management system.

The alert feedback engine 228 may or may not also provide confirmation messages to those who submit feedback. The confirmation message can include relevant details, such as outcome and a transaction ID. FIG. 9 depicts a screenshot 900 of a feedback confirmation message associated with a specific implementation of an alert management system.

The alert queuing engine 230 can make a queue of alerts available to a stakeholder. Alert messages may or may not include all of the relevant information for a stakeholder. When the alert messages do not include relevant information, the stakeholder can be provided the information via the alert queue. Where alert messages include all relevant data, the alert queue may or may not be made available to redundantly provide the data, depending upon the implementation. FIG. 10 depicts an example of an email alert 1000 that could be sent in an implementation of an alert management system, but that does not include all relevant information for a stakeholder to identify (in the text of the alert message) a transaction. The email alert 1000 can include a link 1002 associated with the relevant transaction or with an alert queue. It may be noted that the email does include sufficient information to identify a transaction, just not in the text of the alert message. This may be desirable to keep the data confidential by requiring that a recipient have a stakeholder account and/or to prevent disclosure of the contents of the email from being disseminated.

The alert queue can include typical list-processing commands, such as displaying alerts within a range (date/time, transaction type, outcome, etc.), sorting by a value (alert date/time, issuer, fraud type, merchant, card number, transaction date/time, amount, transaction type, outcome, etc.). FIG. 11 depicts a screenshot 1100 of an alert queue associated with a specific implementation of an alert management system.

Figure 12:
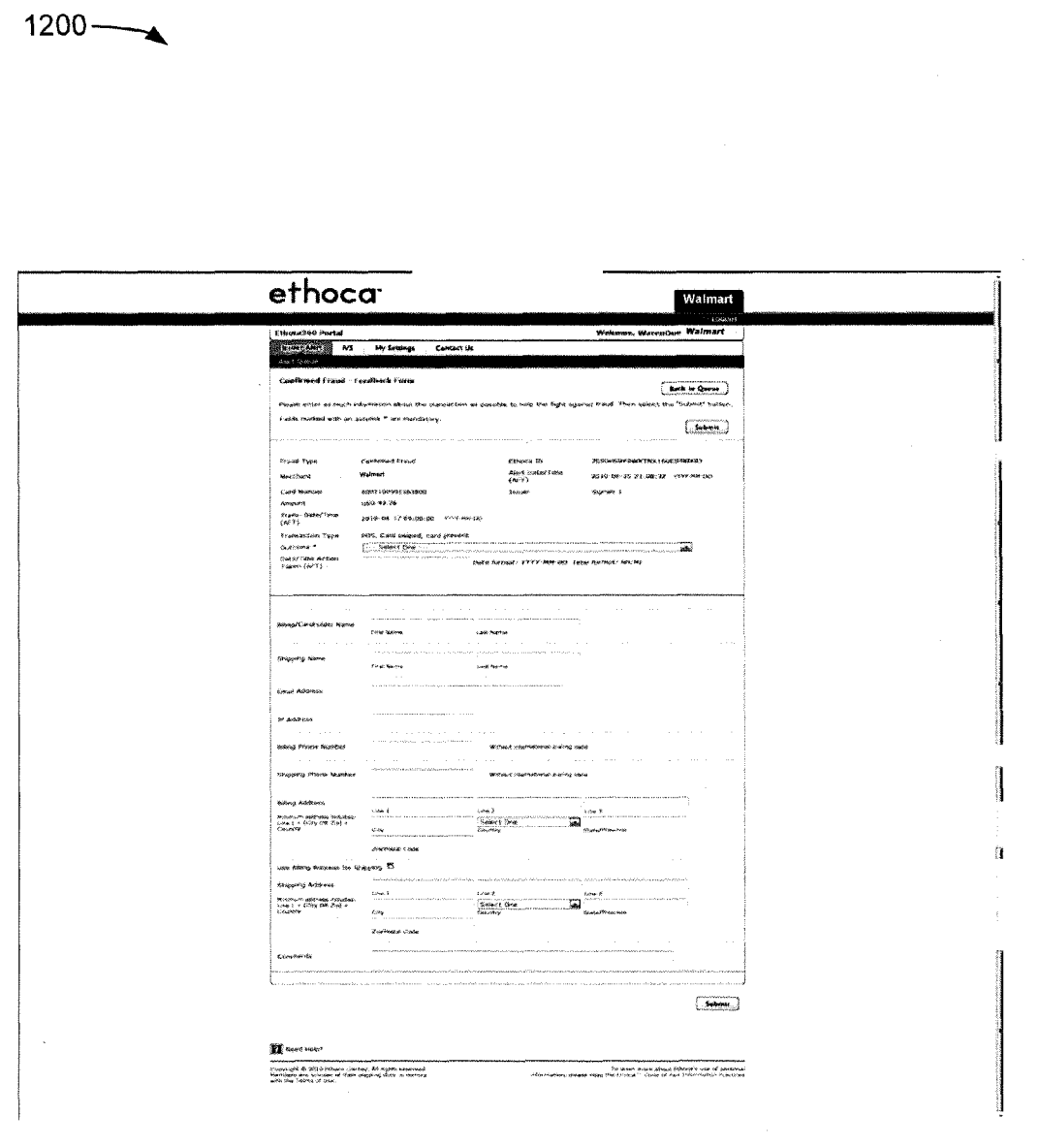

In a system that includes both alert messages with feedback links (see, e.g., FIG. 7) and alert queues (see, e.g., FIG. 11), it may be desirable to provide different feedback forms for each. For example, the feedback form associated with feedback links from an alert message could be like the one illustrated in FIG. 8, while the feedback form associated with feedback on an alert queue could look like the one illustrated in FIG. 12. FIG. 12 depicts a screenshot 1200 of a feedback form associated with a specific implementation of a feedback management system.

Feedback can be provided to other stakeholders as alert updating messages. For example, if a merchant provides feedback in association with a transaction, a credit card issuer could be provided with an alert updating message associated with a previously issuer-submitted transaction that updates the credit card issuer regarding actions taken at the merchant. FIG. 13 depicts an example of an email alert updating message 1300 that could be sent in an implementation of an alert management system. An alert updating message can be replaced with an alert forwarding message for stakeholders that are not aware of the alert.

The alert forwarding engine 232 enables a stakeholder that receives an alert to forward the alert to another relevant party. For example, a merchant alert could be forwarded back to the issuer (see, e.g., FIG. 13). As another example, an airline could forward an alert to a third party travel agent (e.g., Expedia). As another example, a merchant could forward the alert to a carrier responsible for shipping goods purchased in the transaction. As another example, the alert may be received by a payments company (e.g., PayPal), which forwards the alert to the relevant merchant. As another example, the alert could go to a payments company, who forwards to a merchant, who forwards to a carrier, who stops orders from other merchants to the same address and sends alerts to the other merchants, who forward the alert to the relevant issuers, who cancels the card and alerts other merchants of other fraud that is now apparent on the card.

In the example of FIG. 2, the historical data management subsystem 208 includes a report generation engine 234 and a historical datastore 236. The report generation engine 234 can help stakeholders get the facts straight about transactions, who is responsible for the loss, etc. For example, if a credit card issuer is responsible for fraud loss (which is unusual in some countries), the merchant could use an alert to stop the commercial transaction, but fail to report the stop to the credit card issuer. If the credit card issuer receives an alert updating message or checks the historical datastore 236, the issuer can avoid compensating the merchant for the fraudulent transaction despite the stop (i.e., prevent the merchant from both avoiding loss and collecting compensation from the issuer). The historical datastore 236 can be thought of as a "catch-all" datastore that includes all or a subset of data from the other datastores depicted in the example of FIG. 2, and perhaps some additional data that was not described in this paper.

Figure 14:
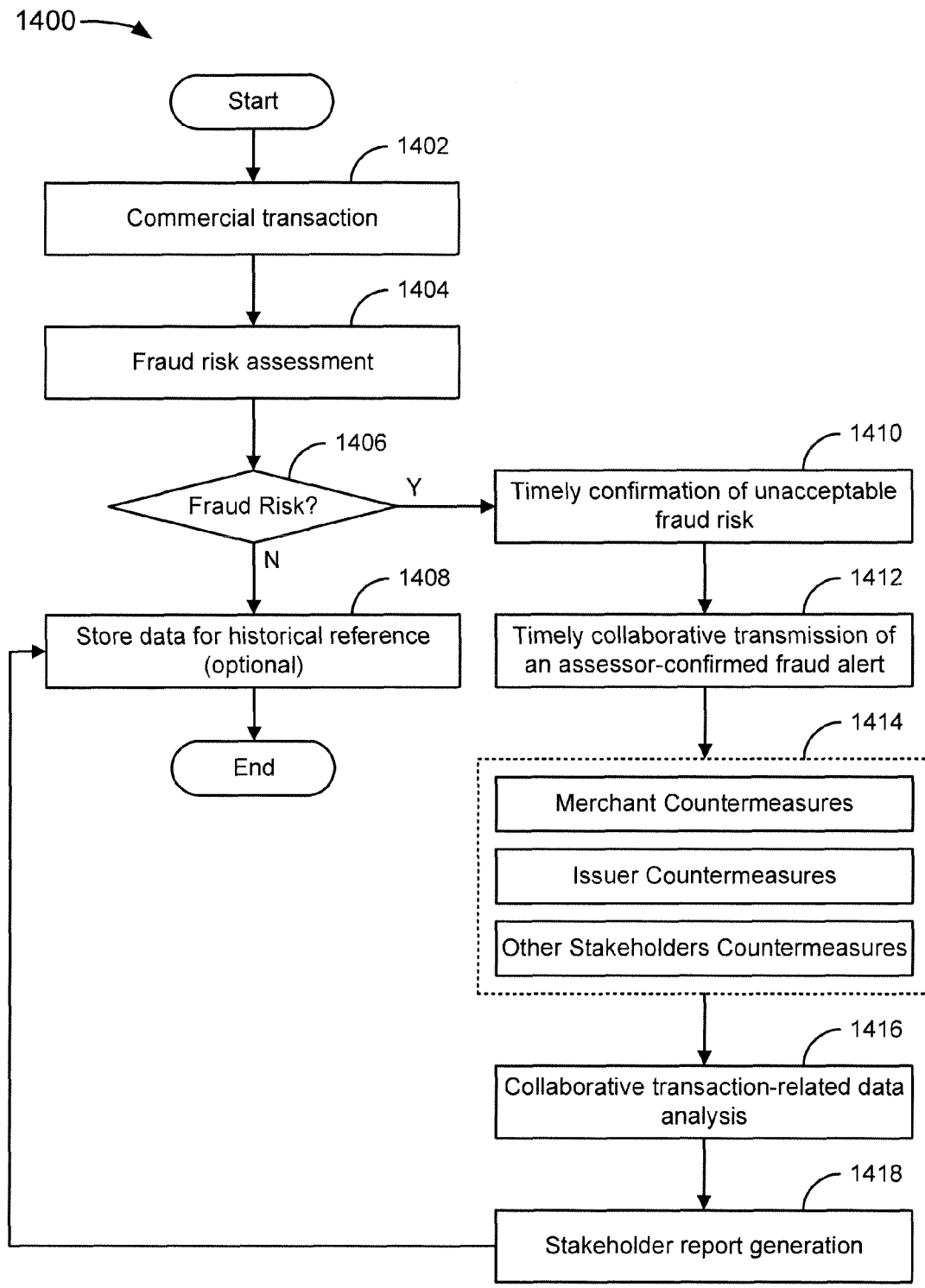
FIG. 14 depicts a flowchart of an example of a method for collaborative response to potential fraud in association with a commercial transaction.

FIG. 14 depicts a flowchart 1400 of an example of a method for collaborative response to potential fraud in association with a commercial transaction. This method and other methods are depicted as serially arranged modules. However, modules of the methods may be reordered, or arranged for parallel execution as appropriate.

In the example of FIG. 14, the flowchart 1400 starts at module 1402 where a commercial transaction takes place. A commercial transaction is between a consumer, who may or may not be authorized to use the payment type used in the transaction, and a merchant. Generally, the commercial transaction can be an exchange of payment for an applicable good or service, but certain POS and types of goods can make some commercial transactions more amenable to timely detection of fraud and meaningful countermeasures. For example, ecommerce POS can delay transmission of purchased goods (even downloadable goods) while a timely fraud risk assessment is performed, mobile devices used in m-commerce can potentially be tracked following a confirmed fraudulent transaction by a service provider that is part of the collaborative network, or camera-monitored POS can gather relevant video data associated with the transaction (e.g., a gas station could capture the license plate of the consumer involved in a commercial transaction, a store could get a picture of the consumer involved in a commercial transaction that might be useful in confirming fraud, etc.). Some types of goods are particular amenable to timely fraud detection and/or countermeasures. For example, furniture is frequently delivered by a carrier, making it easier to react before delivery (and even where the furniture is carried out of a store by a consumer, it may take a sufficiently long amount of time to "get away" that fraud can be confirmed while the consumer is still on the premises), gift cards can be canceled prior to use with timely confirmed fraud, and automobile-related services where parts are provided and then installed have sufficient time between sale of the parts and installation to confirm fraud.

In the example of FIG. 14, the flowchart 1400 continues to module 1404 where fraud risk assessment takes place. Generally, the payment type used in the commercial transaction (1402) can be an applicable known or convenient payment type. However, certain payment types will presumably be associated with a higher risk of fraud and/or higher probability of detecting a fraudulent transaction in a timely fashion, making a certain subset of all payment types more likely to be included in a collaborative system. So, in some implementations, commercial transactions using only a subset of possible payment types are assessed for the risk of fraud. For example, in an implementation, a fraud risk assessment can be performed for credit card payments, but not for other payment types (e.g., debit cards or cash). In other implementations, multiple payment types can be assessed for fraud (e.g., credit card, mobile, and/or other payment types).

Fraud risk assessment can be performed by a solutions provider or "in house" at a stakeholder. For example, a credit card issuer could implement a fraud risk assessment process that includes call-backs to confirm a cardholder was responsible for a commercial transaction that occurred relatively recently. The issuer could, depending upon the implementation, share information with the collaborative network only after obtaining cardholder-confirmed potential fraud and/or sufficiently compelling analytics. Credit card issuers frequently have excellent data associated with a cardholder and a particular transaction making them able to perform such in house analysis. Other stakeholders, such as merchants, might have some useful POS data, and are motivated to detect fraud because merchants in many cases bear the fraud losses, but can have a wide range of resources at their disposal (e.g., some merchants are small) and may need assistance from solutions providers or other stakeholders to become capable of meaningful fraud risk assessment. So, it is expected that the fraud risk assessment will continue to be performed at an issuer, or the equivalent party, or by a stakeholder working with some other stakeholder or solutions provider in the collaborative network.

In the example of FIG. 14, the flowchart 1400 continues to decision point 1406 where it is determined whether the risk of fraud reaches an unacceptable risk threshold. What is "unacceptable risk" can vary. For example, certain types of goods can be more risky because they are more easily fenced. Certain payment types can be riskier because they are inherently riskier (e.g., credit card compared to cash). Greater weight can also be given to relatively large transactions. Whether risk is "unacceptable" could be weighted depending upon the potential for counter-measures, as well. For example, it may be relatively difficult to take effective countermeasures following a quick transaction at a drug store, causing such transactions to be weighted less, while a transaction at an ecommerce website might involve shipping, causing such transactions to be weighted higher to ensure countermeasures can be conducted before next steps are taken.

The determination of fraud risk can be binary in the sense that there is either determined to be an unacceptable risk of fraud or an acceptable risk of fraud that is the functional equivalent of a "no risk" category even if it is impossible to completely eliminate the risk of fraud. Alternatively, multiple unacceptable risk categories can be used, such as, by way of example, a "critical risk" category that can quickly trigger fraud alert based on analytics, a "high risk" category that can trigger a fraud alert based on confirmation from a stakeholder, and a "low (unacceptable) risk" category that could be assessed if time permits.

If it is determined that the risk of fraud does not reach the unacceptable risk threshold (1406-N), then the flowchart 1400 ends at module 1408 where data is optionally stored for historical reference. Historical data can be useful in detecting trends, performing analytics associated with later transactions, detecting mistakes, and/or updating stakeholders with information that is useful for determining responsibilities between the stakeholders. It may be possible to launch an alert based on analysis of the historical data, as well (not shown in FIG. 14).

If it is determined that the risk of fraud reaches the unacceptable risk threshold (1406-Y), then the flowchart 1400 continues to module 1410 with a timely confirmation of unacceptable fraud risk. It may or may not be the case that the fraud risk assessment (1404) and the timely confirmation of unacceptable fraud risk (1410) are part of a single process. For example, it could be the case that any fraud risk assessment has at least an analytics-confirmed fraudulent transaction risk.

Confirmation can be by any of a number of stakeholders. For example, a cardholder could be called after a commercial transaction is made that has an unacceptable risk of fraud; if the cardholder denies having made the transaction then the commercial transaction can be associated with "cardholder-confirmed fraudulent transaction." An analytic assessment could also be used, yielding an "analytics-confirmed fraudulent transaction," potentially in addition to an analytics-based fraud risk assessment (1404). An assessor can make use of cardholder- or analytics-confirmed fraud, yielding an "assessor-confirmed fraudulent transaction."

In the example of FIG. 14, the flowchart 1400 continues to module 1412 with timely collaborative transmission of an assessor-confirmed fraud alert. It may or may not be desirable to name the assessor specifically. In an implementation, the collaborative transmission of an alert is made when the fraud alert is confirmed by a specific stakeholder (e.g., an issuer-confirmed fraud alert). It is also possible to issue alerts that have not been confirmed by a stakeholder.

In the example of FIG. 14, the flowchart 1400 continues to module 1414 where countermeasures are taken by stakeholders. Different countermeasures can be appropriate for different stakeholders. For example, merchant countermeasures can include stopping the order, contacting a carrier to stop shipment, checking photo I.D. at checkout, attempting to stop a consumer from leaving POS, issuing a refund, etc. As another example, issuer countermeasures can include canceling a credit card, issuing a new credit card, sending an account to recovery, processing an affidavit, checking for a refund, processing a chargeback (or not), etc.

In the example of FIG. 14, the flowchart 1400 continues to module 1416 with collaborative transaction-related data analysis. While some stakeholders will not normally wish to share information about, e.g., cardholders, once a transaction is confirmed to be fraudulent (which does not necessarily mean that the transaction was fraudulent, but does mean that the collaborative network will treat it as fraudulent), the stakeholders may be willing to provide any data that is necessary to enable countermeasures to be taken quickly and effectively. Stakeholders will hopefully be relatively responsive to the needs of the collaborative network after fraud is confirmed, but the collaborative network can still function if some data is not shared.

Collaborative transaction-related data analysis is important for several reasons. First, it facilitates communication between, for example, merchants and issuers. Different stakeholders may have different responsibilities in association with a transaction. In a standard credit card transaction, the merchant assumes fraud loss, though there are situations where the issuer can assume the loss. The bookkeeping for a transaction that includes no alerts can include errors, and there may be no effective way for a first stakeholder to assume that the data from a second stakeholder is "good data." When the data analysis is performed for the entire collaborative data set, the data is consistent for all stakeholders.

In the example of FIG. 14, the flowchart 1400 continues to module 1418 with stakeholder report generation. While the entire collaborative data set is consistent for all stakeholders, the specific reports that are generated for the various parties may or may not be the same. For example, an issuer may share data with a trusted alert solutions provider that the issuer would prefer to not have sent to the various parties, such as, by way of example but not limitation, cardholder contact information, the full credit card number (the "last four" might be used), or the like. A report generated for the issuer might include some of the information that the issuer did not wish to share with, say, a carrier, but the carrier report might not include such information. It would be desirable to provide as much information to a stakeholder as the stakeholder needs to make effective use of the report.

In a specific implementation, when alerts are sent, and there is a response, relevant stakeholders get the information. For example, an issuer could send a fraud alert to a merchant and the merchant could stop loss. Relevant information for the issuer is that the merchant stopped loss. So the system would ensure that the issuer received that information.

In the example of FIG. 14, the flowchart ends at module 1408, as described previously. Of course, there may be additional data, such as data about the alert (1412), countermeasures (1414), data analysis (1416), or the stakeholder report itself (1418), which would be generated if the modules were implicated by detecting an unacceptable fraud risk (1406-Y). An assessor report, or any other report, might also include data associated with the confirmation of unacceptable fraud risk (1410).

It may be desirable to issue reports that aggregate information about individual transactions after multiple iterations of the flowchart 1400. In this way, the report could quantify how much merchants or other stakeholders saved, how much a particular industry (e.g., the airline industry) saved, or how much a particular stakeholder saved over the course of a given time period.

By creating a data structure that includes relevant data values, it becomes possible to provide actionable intelligence across a collaborative network. Creative identification of various data items as relevant and non-confidential under a given set of circumstances (e.g., in the case of suspected fraud) to enable distribution to relevant parties can dramatically improve response time. Perhaps for this reason, an embodiment of the techniques described in this paper has garnered interest in adoption from 19 of 20 of the largest e-commerce sites, and adoption by the $20^{th}$ seems reasonably likely at some point.

The data structure includes a stakeholder identifier, transaction vehicle identifier (e.g., credit card number), and transaction details. Advantageously, the transaction vehicle identifier can be an old, and therefore no longer confidential (or sensitive) data, identifier. The transaction details are no longer sensitive because the transaction was presumably fraudulent; so consumers should not be concerned about the sharing of transaction details.

The data structure can be further associated with an outcome to facilitate processing of the data as appropriate, and other details that implicate other stakeholders, such as carriers or merchant agents. As the data structure compiles the additional data, it increasingly becomes useful to all or a subset of the stakeholders associated with the transaction.

The detailed description discloses examples and techniques, but it will be appreciated by those skilled in the relevant art that modifications, permutations, and equivalents thereof are within the scope of the teachings. It is therefore intended that the following appended claims include all such modifications, permutations, and equivalents. While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under U.S.C. §112, 116 will begin with the words "means for", but use of the term "for" in any other context is not intended to invoke treatment under 35 U.S.C. §112, 116.) Accordingly, the applicant reserves the right to add additional claims after filing the application to pursue such additional claim forms for other aspects of the invention.

What is claimed is:

1. A stakeholder collaboration system, comprising:
   a collaboration facilitator system;
   a facilitator datastore, coupled to the collaboration facilitator system, configured to store a collaborative transaction record that includes a commercial transaction record for a transaction between a customer and a merchant;
   a network interface, coupled to the collaboration facilitator system, to facilitate communication through a network;
   wherein, in operation, the collaboration facilitator system:
   generates an assessor-confirmed fraud risk alert including a feedback mechanism and an indication of assessor-confirmed fraud risk;
   makes the assessor-confirmed fraud risk alert available to a merchant device;
   receives feedback from the merchant device, including an indication of results of countermeasures taken in association with the commercial transaction;

generates an alert updating message from the feedback, including an indication of the results of countermeasures taken in association with the commercial transaction;

makes the alert updating message available to an issuer device, whereby consistent data regarding countermeasures taken regarding the commercial transaction is available to the issuer device.

2. The system of claim 1, wherein the collaborative transaction record includes at least a subset of data contained in a consumer record of an issuer datastore.

3. The system of claim 1, further comprising:

a point of sale (POS) system coupled to the merchant device;

a merchant datastore, coupled to the POS system, configured to store commercial transaction records including an identifier of goods or services purchased, transaction amount, and date of transaction for commercial transactions, wherein for a credit card transaction a corresponding commercial transaction record includes a credit card number and expiration date of a credit card of a cardholder, wherein for a transaction that includes shipment of goods a corresponding commercial transaction record includes a shipping address;

wherein, in operation, the merchant system shares at least some information from a commercial transaction record with an issuer system coupled to the issuer device, wherein for the credit card transaction the information includes the credit card number, the expiration date of the credit card, and the transaction amount.

4. The system of claim 1, further comprising:

an issuer system coupled to the issuer device;

an issuer datastore, coupled to the issuer system, configured to store consumer records including an identifier of a purchaser of goods or services;

wherein, in operation, the issuer device:

makes at least some information from a consumer record associated with the commercial transaction record available to an assessor system;

obtains an assessor-confirmed fraud risk assessment associated with the commercial transaction record from the assessor system;

sends to the collaboration facilitator system an assessor-confirmed fraud risk notification in accordance with the assessor-confirmed fraud risk assessment.

5. The system of claim 1, further comprising:

a fraud risk assessor device;

an assessor datastore, coupled to the fraud risk assessor device, configured to store an assessor transaction record that includes at least a subset of data contained in a consumer record of an issuer datastore and at least a subset of data contained in the commercial transaction record of a merchant datastore.

* * * * *